United States Patent [19]

Fujii et al.

[11] Patent Number: 5,611,589
[45] Date of Patent: Mar. 18, 1997

[54] SEAT ARRANGEMENT FOR MOTOR VEHICLE

[75] Inventors: Masanobu Fujii, Yourou; Tomoki Matsubara, Ueda; Mitsuru Tanaka; Naoki Sugihara, both of Oogaki, all of Japan

[73] Assignee: Ikeda Bussan Co., Ltd., Ayase, Japan

[21] Appl. No.: 350,893

[22] Filed: Dec. 7, 1994

[30] Foreign Application Priority Data

Feb. 3, 1994 [JP] Japan .................................. 6-031894

[51] Int. Cl.⁶ ........................................... B60N 2/06
[52] U.S. Cl. ......................... 296/64; 296/65.1; 297/257
[58] Field of Search .......................... 296/63, 64, 65.1; 297/232, 257

[56] References Cited

U.S. PATENT DOCUMENTS

| | | | |
|---|---|---|---|
| 1,306,498 | 6/1919 | Moses | 296/65.1 |
| 1,397,594 | 11/1921 | Moses | 296/63 X |
| 3,512,827 | 5/1970 | Stange | 296/64 |
| 4,157,797 | 6/1979 | Fox | 296/65.1 X |
| 4,341,415 | 7/1982 | Braun et al. | 296/65.1 |
| 4,955,973 | 9/1990 | Provencher | 296/65.1 |
| 5,280,987 | 1/1994 | Miller | 296/65.1 |

FOREIGN PATENT DOCUMENTS

| | | |
|---|---|---|
| 58-115429 | 8/1983 | Japan . |
| 61-80132 | 5/1986 | Japan . |

*Primary Examiner*—Andrew C. Pike
*Attorney, Agent, or Firm*—Foley & Lardner

[57] ABSTRACT

A seat arrangement comprises first, second, and third groups of seats arranged lengthwise in order on a vehicle floor. Each of the second and third groups of seats includes left and right side seats arranged abreast with a center space defined therebetween. A rail structure extends longitudinally between the center space of the second group of seats and that of the third group of seats. A center seat is slidably mounted on the rail structure, so that the center seat can move between a front position where the center seat is positioned between the side seats of the second group of seats and a rear position wherein the center seat is put between the side seats of the third group of seats.

9 Claims, 5 Drawing Sheets

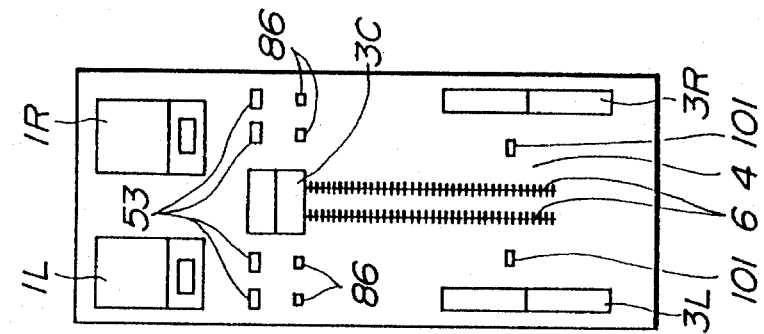
FIG. 5
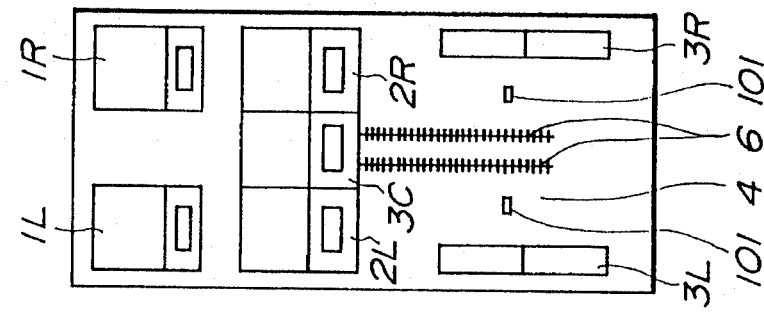
FIG. 4
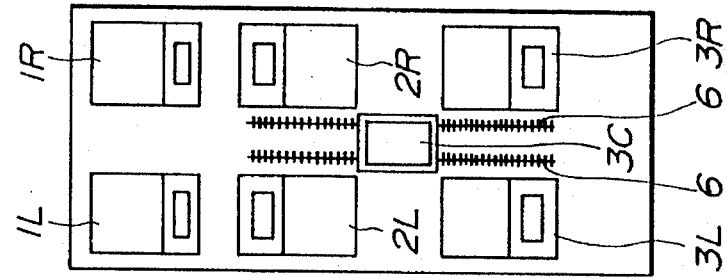
FIG. 3
FIG. 2
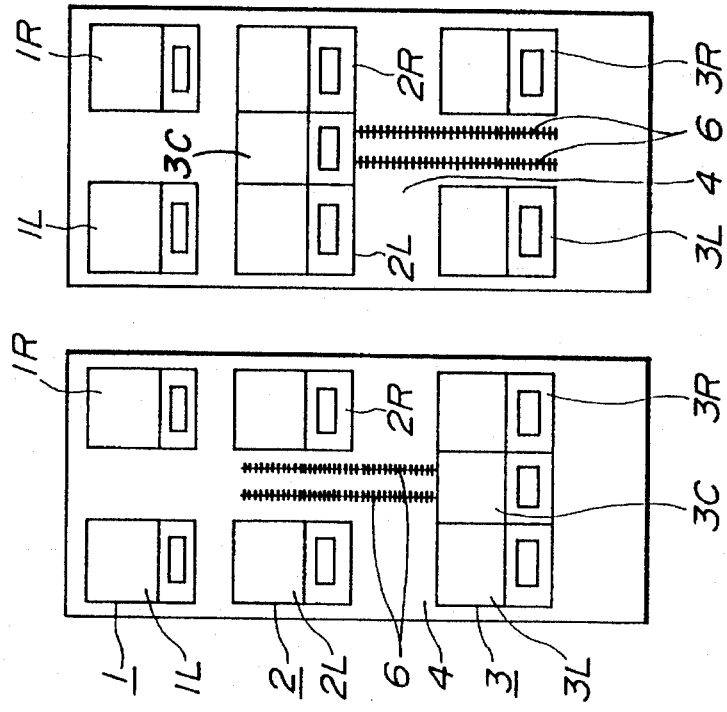
FIG. 1

SEAT ARRANGEMENT FOR MOTOR VEHICLE

BACKGROUND OF THE INVENTION

1. Field of the Invention

The present invention relates in general to seat arrangements for a motor vehicle, and more particularly to seat arrangements suitable for one-box car or the like, which can carry passengers and luggage. More specifically, the present invention is concerned with seat arrangements of a type having a plurality of seats at least one of which is detachable and/or slidable for preparing an extra luggage space in the motor vehicle.

2. Description of the Prior Art

Hitherto, various seat arrangements of the above-mentioned type have been proposed and put into practical use. Some of them are disclosed in Japanese Utility Model First Provisional Publications 58-115429 and 61-80132. The seat arrangement shown by 58-115429 publication is of the type that employs detachable seats, and the arrangement shown by 61-80132 is of a type that employs slidable seats.

However, they have failed to give users satisfaction due to the troublesome handling work required for detaching or sliding the seats and an insufficient luggage space inevitably provided by such seat detaching and/or sliding arrangement.

SUMMARY OF THE INVENTION

It is therefore an object of the present invention to provide a seat arrangement of a motor vehicle, which is free of the above-mentioned drawbacks.

According to the present invention, there is provided a seat arrangement for a motor vehicle having a vehicle floor. The seat arrangement comprises first, second, and third groups of seats arranged lengthwise in order on the vehicle floor, each of the second and third groups of seats including left and right side seats arranged abreast with a center space defined therebetween. A rail structure extends longitudinally between the center space of the second group of seats and that of the third group of seats. A center seat is slidably mounted on the rail structure, so that the center seat is movable between a front position where the center seat is positioned between the side seats of the second group of seats and a rear position where the center seat is positioned between the side seats of the third group of seats.

BRIEF DESCRIPTION OF THE DRAWINGS

Other objects and advantages of the present invention will become apparent from the following description when taken in conjunction with the accompanying drawings, in which:

FIG. 1 is a top plan view showing one service condition of a seat arrangement of the present invention.

FIG. 2 is a top plan view similar to FIG. 1, showing a center seat positioned in the second seat row.

FIG. 3 is a top plan view similar to FIG. 1, showing the center seat folded and positioned between the second and third seat rows.

FIG. 4 is a top plan view similar to FIG. 2, showing the center seat positioned in the second seat row, with the side seats in the third row folded.

FIG. 5 is a top plan view similar to FIG. 2, with the side seats in the third row folded, the side seats in the second row removed, and the center seat folded and positioned in the second seat row.

DETAILED DESCRIPTION OF THE INVENTION

Figure 6:
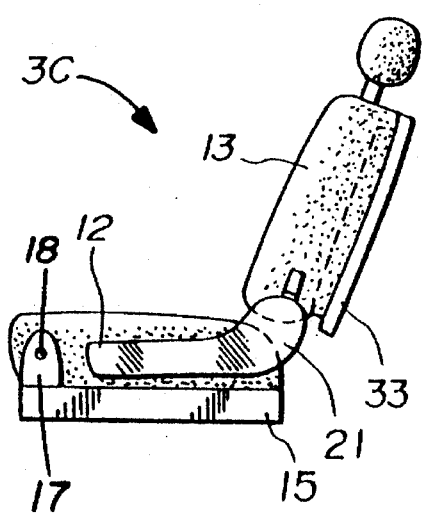
FIG. 6 is a side plan view showing the center seat with its seat back in a substantially operational upright position.

In the following, a seat arrangement according to the present invention will be described in detail with reference to the accompanying drawings.

As is seen from FIGS. 1 to 5, the seat arrangement of the present invention comprises generally a first group or row of seats 1, a second group or row of seats 2, a third group or row of seats 3, which are arranged lengthwise in order on a vehicle floor 4, and a center seat 3C arranged to move axially. As will become apparent hereinafter, each seat of the first, second, and third groups of seats 1, 2, and 3 and the center seat 3C comprise generally a seat cushion part and a seat back part.

The first group of seats 1 comprises a left (or front passenger's) seat 1L and a right (or driver's) seat 1R which are laterally spaced from each other.

The second group of seats 2 comprises left and right side seats 2L and 2R arranged abreast with a center space defined therebetween. Each of the side seats 2L and 2R is detachably connected through a coupling mechanism to the vehicle floor 4 and is capable of turning about a given vertical axis.

The third group of seats 3 comprises left and right side seats 3L and 3R arranged abreast with a center space defined therebetween. Each side seat 3L or 3R can be entirely folded in a manner as will be described hereinafter.

As will be understood from FIGS. 1 to 3, the center seat 3C is arranged to run in fore-and-aft directions on parallel rails 6 mounted on the vehicle floor 4. These parallel rails 6 extend longitudinally between the center space defined by the side seats 2L and 2R of the second group of seats 2 and the center space defined by the side seats 3L and 3R of the third group of seats 3. More specifically, the rails 6 extend between a front end of the second group of seats 2 and a rear end of the third group of seats 3, as shown. Thus, the center seat 3C can slide between a rear position as shown in FIG. 1 where it is neatly put between the left and right seats 3L and 3R of the third group of seats 3 and a front position as shown in FIG. 2 where it is neatly put between the left and right seats 2L and 2R of the second group of seats 2.

FIG. 3 shows a service condition wherein the center seat 3C is positioned in halfway with its seat back part folded and the side seats 2L and 2R of the second group of seats 2 are turned 180 degrees to face the side seats 3L and 3R of the third group of seats 3. Thus, in this case, the folded seat back part of the center seat 3C may be used as a table.

FIG. 4 shows another service condition where the side seats 3L and 3R of the third group of seats 3 are entirely folded and the center seat 3C assumes its front position. Thus, in this condition, a rear part of the vehicle floor 4 can be effectively used as a luggage carrying space. Upon requirement of the luggage space, the center seat 3C is slid to the front position and each side seat 3L or 3R is flattened and then pivotally raised. The flattened and raised side seats 3L and 3R thus stand upright beside opposed side walls of the vehicle body, as shown.

FIG. 5 shows still another sevice condition where the side seats 2L and 2R of the second group of seats 2 are removed, the side seats 3L and 3R of the third group of seats 3 are fully folded, and the center seat 3C in the front position is fully folded. Thus, in this condition, much larger luggage space is provided. The fully folded state of the center seat 3C is achieved by pivoting the entire center seat 3C forward with the seat back part kept folded. Of course, if a suitable coupling mechanism is employed, the center seat 3C can be removed from the rails 6 with a simple detachment. In this case, much larger luggage space can be prepared.

Figure 10:
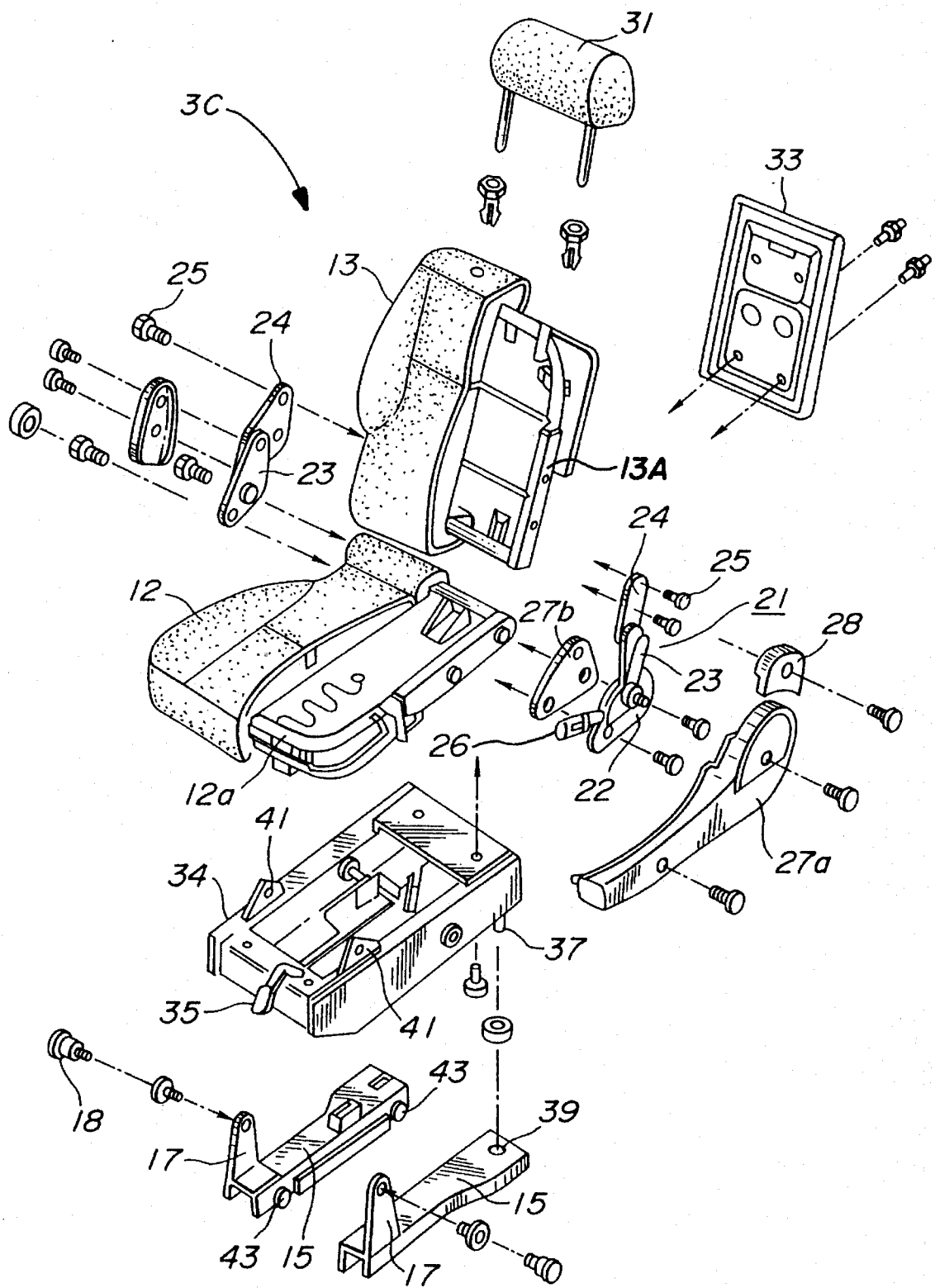
FIG. 10 is an exploded perspective view of one embodiment of the center seat.

Referring to FIG. 10, there is shown in detail the center seat 3C. The center seat 3C generally comprises a seat cushion part 12, a seat back part 13, and a reclining mechanism 21 through which the seat back part 13 can be pivoted to a desired angular position relative to the seat cushion part 12.

As will be described in detail hereinafter, the seat cushion part 12 is pivotally connected at its front portion to respective sliders 15. The seat cushion part 12 thus can pivot forward relative to the sliders 15. The sliders 15 are slidably engaged with the rails 6. Thus, the center seat 3C can slide forward and rearward on and along the rails 6. Although not shown in the drawing, a known lock mechanism is employed for locking the seat sliders 15 at a desired fore-and-aft position of the seat 3C.

The reclining mechanism 21 generally comprises two first base plates 22 (only one is shown) secured to side ends of a frame 12a of the seat cushion part 12, two links 23 pivotally connected to the base plates 22, and two second base plates 24 pivotally connected to the links 23 and secured through bolts 25 to lower side ends of a frame 13a of the seat back part 13. A gear mechanism is operatively interposed between the first and second base plates 22 and 24 to lock the second base plate 24 at a desired angular position of the seat back part 13. Designated by numeral 26 is a lock cancel lever for canceling the locked condition of the second base plate 24 (that is, the locked condition of the seat back part 13) when manipulated. Designated by numeral 27a is an outer device cover, 27b is an inner device cover, 28 is an arm cover, 31 is a headrest, and 33 is a table board secured to the back surface of the seat back part 13.

Figure 7:
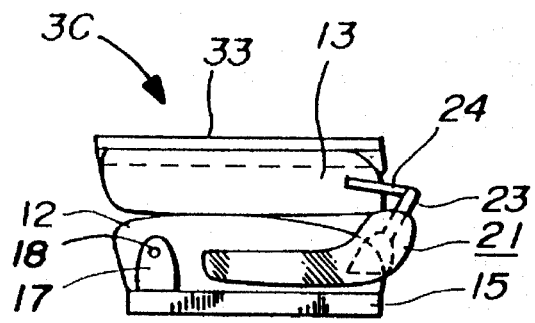
FIG. 7 is a side plan view similar to FIG. 6, with the seat back folded in a horizontal position.

As is seen from FIG. 7, the reclining mechanism 21 is so constructed as to permit the seat back part 13 to be fully fold on the seat cushion part 12. Thus, in the condition of FIG. 7, the table board 33 is kept horizontal.

Referring back to FIG. 10, a base unit 34 is interposed between the seat cushion frame 12a and the sliders 15. The base unit 34 is secured to the seat cushion frame 12a by means of bolts. The base unit 34 is provided with two spaced brackets 41 which are pivotally connected through pins 18 to respective brackets 17 of the sliders 15. Thus, the base unit 34 and the seat cushion part 12 can pivot like a single unit relative to the sliders 15.

Figure 8:
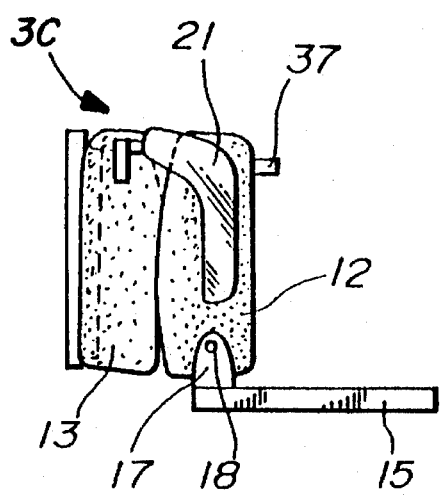
FIG. 8 is a side plan view similar to FIG. 7, with the seat back folded and the center seat pivoted forward by about 90 degrees.

As is seen from FIG. 8, with this pivot arrangement, the entirety of the center seat 3C can pivot forward by about 90 degrees with the seat back part 13 kept fully folded on the seat cushion part 12.

Referring back to FIG. 10, one of the sliders 15 is formed at its rear end with a positioning opening 39. The base unit 34 is provided with a positioning pin 37 that is led into the positioning opening 39 of the slider 15 when the base unit 34 is properly seated onto the sliders 15.

Designated by numeral 35 is a control lever of a seat position locking mechanism that can lock the sliders 15 (viz., the center seat 3C) to the rails 6 at a desired fore-and-aft position of the seat 3C. The locking mechanism may be of a known type that comprises a locking pawl pivotally held by one of the sliders 15 and a plurality of aligned openings formed in one of the rails 6. That is, engagement of the locking pawl with one of the openings brings about the locked condition of the seat 3C relative to the rails 6.

Designated by numerals 43 are front and rear rollers carried by the sliders 15 for smoothing the movement of the sliders 15 on the rails 6.

Figure 9:
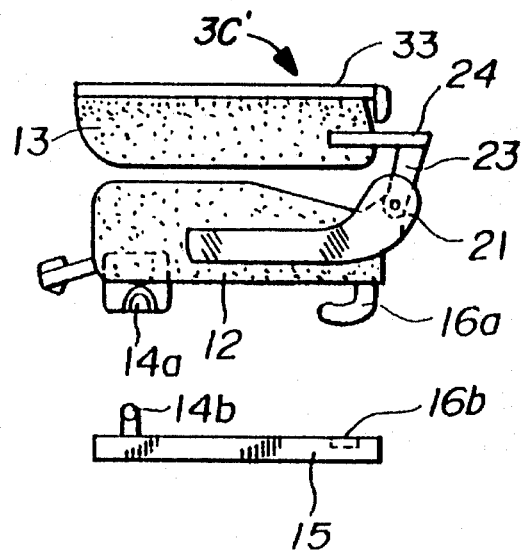
FIG. 9 is a side plan view similar to FIG. 7, showing another embodiment where the center seat is detachable.

Referring to FIG. 9, there is shown a modification of the center seat 3C'. In this modification, a coupling mechanism is arranged between the seat cushion part 12 and the sliders 15 for fully detaching the center seat 3C' from the sliders 15 upon requirement. The coupling mechanism comprises a latch member 14a and a hook member 16a that are connected to the seat cushion part 12 and a striker 14b and an engaging member 16b connected to the sliders 15. Under a coupled condition, the latch member 14a is engaged with the striker 14b and the hook member 16a is engaged with the engaging member 16b. To detach the seat 3C', the hook member 16a is manipulated to disengage from the engaging member 16b and the latch member 14a is manipulated to disengage from the striker 14b. With this, the center seat 3C' can be removed from the rails 6.

Figure 11:
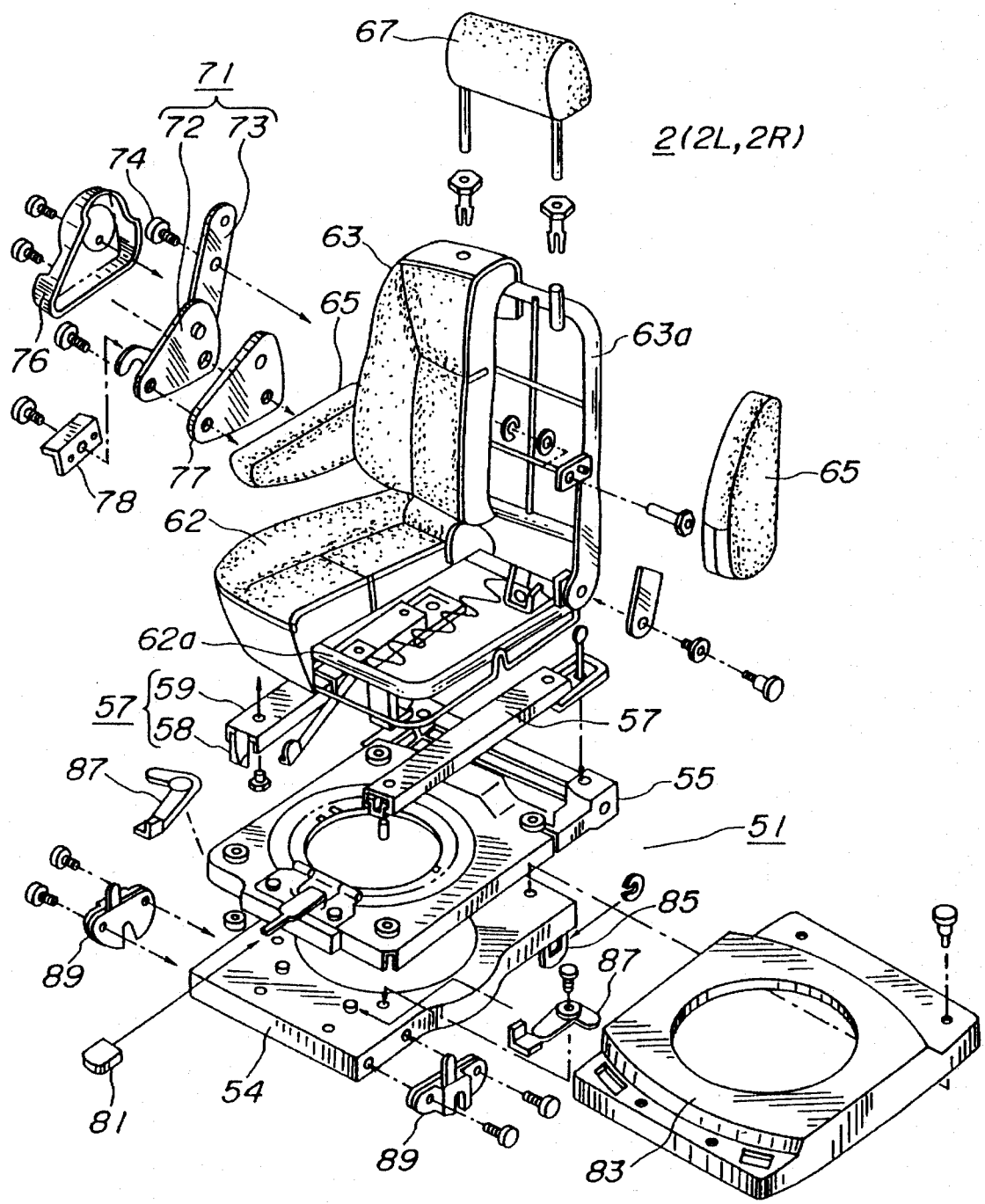
FIG. 11 is an exploded perspective view of one embodiment of the side seats of the second seat row.

Referring to FIG. 11, there is shown the left side seat 2L (or right side seat 2R) of the second group of seats 2. As previously described, the side seat 2L (or 2R) is detachably connected to the vehicle floor 4 and capable of turning about a given vertical axis. For these detaching and turning functions, a turning mechanism 51 is employed, which is detachably connected to the vehicle floor 4 through a coupling mechanism described below.

The turning mechanism 51 comprises a lower base member 54, an upper base member 55, a lock mechanism (no numeral), and a lock cancel lever 81. The lower base member 54 is covered with a cover 83. The upper base member 55 is turnable or rotatable about a given vertical axis to a desired locked position relative to the lower base member 54. Upon manipulation of the lock cancel lever 81, the locked condition of the upper base member 55 is canceled and thus thereafter the upper base member 55 can be rotated to another desired locked position. The lower base member 54 is provided at its rear end with a pair of hook members 85 that are detachably engaged with engaging openings 86 (see FIG. 5) formed in the vehicle floor 4. The lower base member 54 is further provided at its front end with a pair of lock members 89 that are detachably engaged with strikers 53 (see FIG. 5) mounted to the vehicle floor 4. Two lock levers 87 operate to selectively establish engagement and disengagement between the hook members 85 and the engaging openings 86. Thus, the hook members 85, the engaging openings 86, the lock members 89, the strikers 53, and the lock levers 87 constitute the coupling mechanism.

The upper base member 55 has a pair of slide units 57 mounted thereon. Each slide unit 57 comprises a lower rail 58 secured to the upper base member 55 and an upper rail 59 secured to the side seat 2L (or 2R). The side seat 2L (or 2R) is thus slidable relative to the upper base member 55.

Similar to the afore-mentioned center seat 3C, the slide units 57 have a seat position locking mechanism for locking the upper rails 59 at a desired position relative to the lower rails 58 and a control lever for canceling the locked condition of the upper rails 59.

The side seat 2L comprises a seat cushion part 62 mounted on the turning mechanism 51, a seat back part 63 pivotally connected to the seat cushion part 62, a pair of arm rests 65 pivotally supported on the seat back part 63 and a head rest 67 supported on the seat back part 63. A reclining mechanism 71 is interposed between the seat cushion part 62 and the seat back part 63 for pivoting the seat back part 63 to a desired angular locked position relative to the seat cushion part 62. The reclining mechanism 71 comprises a base member 72 secured to a frame 62a of the seat cushion part 62, an arm member 73 pivotally connected to the base member 72 and secured through bolts 74 to a frame 63a of the seat back part 63, a gear mechanism operatively interposed between the base member 72 and the arm member 73 to provide a locked angular position of the arm member 73 relative to the base member 72, and a lock cancel lever 78 that cancels the locked condition of the arm member 73 (that is, the locked condition of the seat back part 63) when manipulated. Designated by numerals 76 and 77 are covers for the reclining mechanism.

Figure 12:
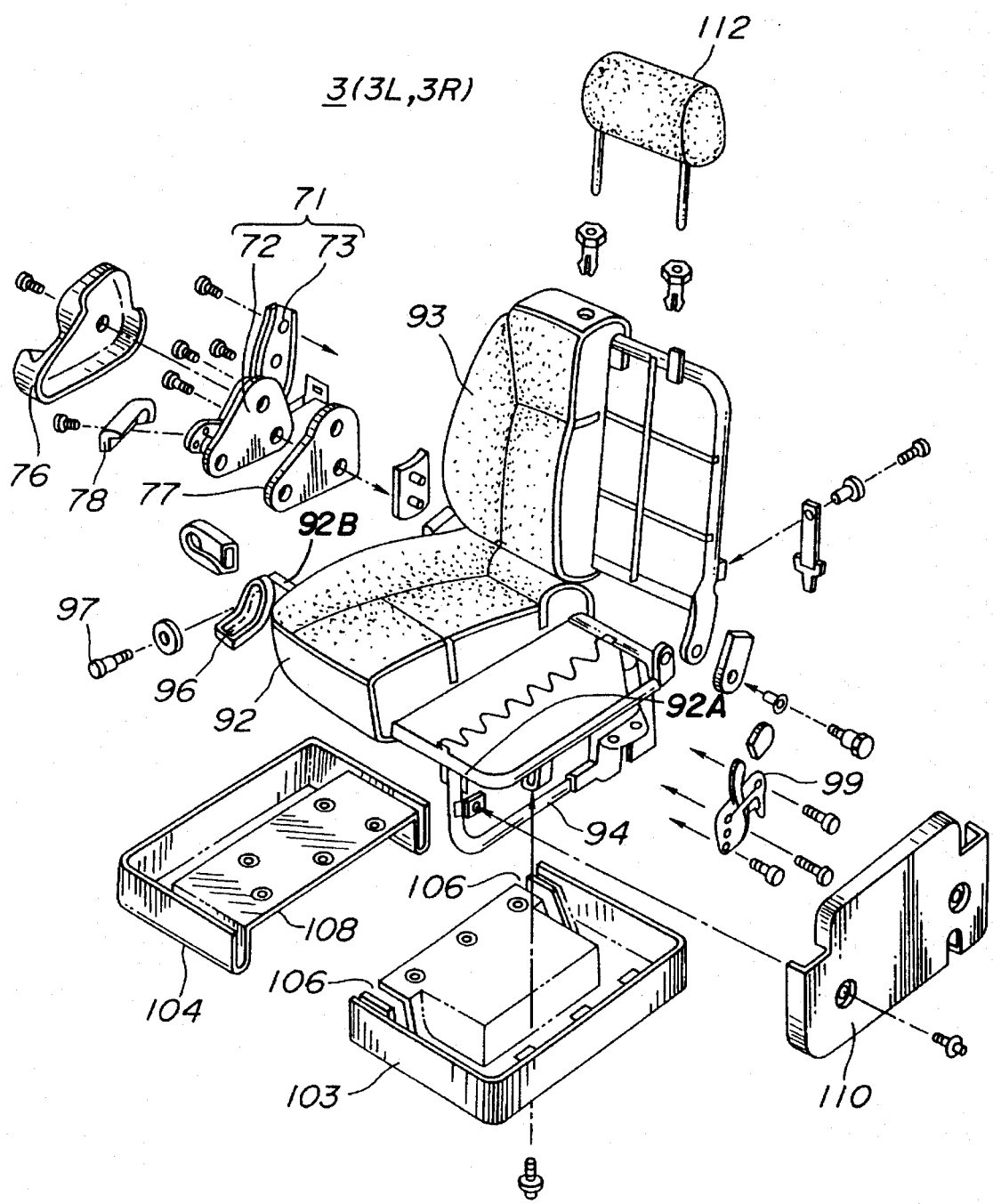
FIG. 12 is an exploded perspective view of one embodiment of the side seats of the third seat row.

Referring to FIG. 12, there is shown the left side seat 3L (or right side seat 3R) of the third group of seats 3. As has been described hereinafore, the side seat 3L or 3R can be fully flattened and pivotally raised at the fixed position. A seat cushion part 92, a seat back part 93, a reclining mechanism 71, a lock cancel lever 78, and a headrest 112 are substantially the same in construction as those of the above-mentioned side seat 2L or 2R of the second group of seats 2. However, the reclining mechanism 71 is so constructed as to permit the seat cushion part 92 and the seat back part 93 to take a full flat condition, and the headrest 112 is detachably connected to the seat back part 93.

A U-shaped leg member 94 is pivotally connected at its upper ends to the frame 92a of the seat cushion part 92. Thus, the leg member 94 can be folded below the seat cushion part 92. A lock device 99 is fixed to the leg member 94, which locks the leg member 94 in its unfolded or projected position. A cover 110 is mounted to the leg member 94.

Two under covers 103 and 104 are mounted to the lower surface of the seat cushion part 92. The under covers 103 and 104 are constructed to neatly receive therein the leg member 94 when the latter is fully folded. For this purpose, the under cover 103 is formed with grooves 106 through which parts of the leg member 94 pass when the leg member 94 is pivoted, and the other under cover 104 is formed with a rectangular recess 108 which is sized to fully receive the folded leg member 94.

A pivot mechanism is further employed, which operates to pivotally raise the flattened side seat 3L or 3R. The pivot mechanism comprises a lug 92b projected laterally outward from the frame 92a of the seat cushion part 92, a bracket 96 secured to the vehicle floor 4, and a pivot pin 97 pivotally connecting the lug 92b and the bracket 96. The pivot pin 97 extends in parallel with the axis of the vehicle floor 4.

When in use of the side seat 3L or 3R, the leg member 94 is projected and supports the seat proper above the vehicle floor 4 with an aid of the pivot mechanism (92b, 96, and 97).

While, upon requirement of full folding of the seat 3L or 3R, the seat back part 93 is pivoted rearward and downward to provide a fully flattened condition of the seat, and then the flattened seat is entirely pivoted upward and outward about the axis of the pivot pin 97. With this, the flattened seat 3L or 3R can stand upright and compactly beside the wall of the vehicle body, as is understood from FIGS. 4 and 5.

What is claimed is:

1. A seat arrangement for a motor vehicle having a vehicle floor, the seat arrangement comprising:

first, second, and third groups of seats arranged lengthwise in order on said vehicle floor, each of said second and third groups of seats including left and right side seats arranged abreast with a center space defined therebetween;

a railway structure extending longitudinally between the center space of said second group of seats and that of said third group of seats; and a center seat slidably mounted on said railway structure, so that the center seat is movable between a front position where the center seat is positioned between the side seats of the second group of seats and a rear position where the center seat is positioned between the side seats of the third group of seats.

2. A seat arrangement as claimed in claim 1, wherein said center seat includes a foldable seat back part that serves as a table when the seat back part is folded forward.

3. A seat arrangement as claimed in claim 2, wherein the seats of the second group of seats are constructed to turn about respective vertical axes thereof by at least 180 degrees, so that the seats of the second group of seats face the seats of the third group of seats.

4. A seat arrangement as claimed in claim 3, wherein the seats of the second group of seats are detachably mounted to said vehicle floor through respective coupling mechanisms.

5. A seat arrangement as claimed in claim 4, wherein the seats of the third group of seats are constructed to be compactly foldable while being fully flattened.

6. A seat arrangement as claimed in claim 3, wherein the seats of the third group of seats are constructed to be compactly foldable while being fully flattened.

7. A seat arrangement as claimed in claim 2, wherein said center seat comprises:

sliders slidably engaged with the railway structure;

a base unit pivotally connected to said sliders;

a seat cushion part tightly mounted on said base unit so that said base unit and said seat cushion part pivot as a single unit relative to said sliders, wherein the seat back part is pivotally connected to said seat cushion part; and a table board secured to a back surface of said seat back part.

8. A seat arrangement as claimed in claim 7, further comprising:

a reclining mechanism for locking said seat back part at a desired angular position relative to said seat cushion part.

9. A seat arrangement as claimed in claim 8, wherein the center seat further comprises a coupling mechanism through which the center seat is easily detachable from said sliders with a simple manipulation.

* * * * *